INVENTOR.
JOHN T. FRANKS JR.
BY
ATTORNEY

July 20, 1965 J. T. FRANKS, JR 3,196,417

MAGNETIC CIRCUITS

Filed Dec. 21, 1961 2 Sheets-Sheet 2

*INVENTOR.*
JOHN T. FRANKS JR.

*BY* [signature]

ATTORNEY

United States Patent Office 3,196,417

Patented July 20, 1965

3,196,417

MAGNETIC CIRCUITS

John T. Franks, Jr., Akron, Ohio, assignor to Goodyear Aerospace Corporation, a corporation of Delaware Filed Dec. 21, 1961, Ser. No. 161,042
9 Claims. (Cl. 340—174)

This invention relates to magnetic circuits capable of performing logical storage and operation and more particularly to magnetic circuit having a multi-aperture magnetic ferrite core.

Heretofore it has been known to use multiflux path magnetic cores in magnetic circuits capable of performing logical operations. These circuits use unilateral impedance devices, such as diodes or other semi-conductors to maintain the forward flow of information. Circuits having diodes, transistors, or relays, and magnetic cores have the disadvantages of being bulky, of consuming large amounts of power, and of having relatively slow speeds.

It is the general object of the invention to avoid and overcome the foregoing and other difficulties of the prior art practice by the provision of a simple, and a compact magnetic core logic circuit capable of performing logical operations all within the core structure.

Another object of the invention is to provide a magnetic circuit which does not have diodes or other semi-conductor elements.

Another object of the invention is to provide a multi-aperture magnetic core which has a geometric configuration permitting the same core to be used in a logical "OR" circuit a $\overline{A}\cdot\overline{B}$ circuit, or a $\overline{A}U\overline{B}$ circuit.

Another object of the invention is to provide a magnetic circuit which can perform the logical storage and "OR" function completely within a multi-aperture magnetic core.

Another object of the invention is to provide a magnetic circuit which can perform the logical storage and $\overline{A}\cdot\overline{B}$ function completely within a multi-aperture magnetic core.

Another object of the invention is to provide a magnetic circuit which can perform logical storage and $\overline{A}U\overline{B}$ function completely within a multi-aperture magnetic core.

According to the invention, the magnetic circuit includes a magnetic core having a plurality of parallel legs defining separate flux paths. The legs are connected to a pair of parallel side rails. The cross-sectional area of the side rail adjacent the first and second legs is substantially equal to the cross-sectional area of the first leg. The cross-sectional area of the remaining part of the side rails is substantially twice the cross-sectional area of the first leg. The flux density in the respective portions of the core is controlled by the cross-sectional area thereof. The lateral distance between the respective legs provides the core with the proper flux steering. An input pulse applied to one of the legs provides the circuit with information by switching the flux pattern therein. Four separate drive means linked with the respective legs selectively switch the flux pattern therein to shift the information in the circuit. To prevent the switching of the flux pattern in some of the legs, thereby preventing the reverse flow of information, the legs are selectively biased. A change in the flux pattern of the portion of the core adjacent the output windings will induce a signal therein. This signal represents a bit of information leaving the circuit.

The exact nature of this invention as well as other objects and advantages thereof will be readily apparent from the consideration of the following specification relating to the annexed drawing in which.

Figure 1:
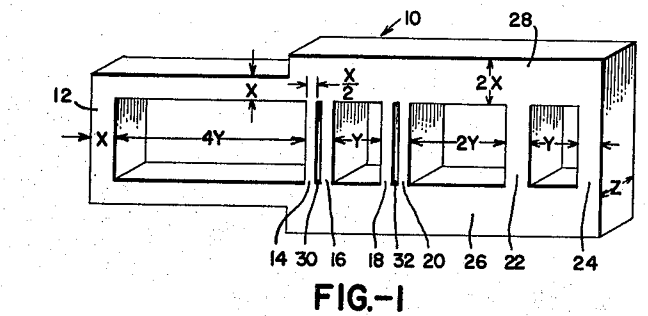
FIG. 1 is a perspective view of one multipath magnetic core showing the geometric configuration thereof.

Referring now to the drawings, there is shown in FIG. 1 a rectangular shaped ferrite magnetic core 10. The magnetic material forming the magnetic core preferably has a substantially square or rectangular hysteresis characteristic. The core 10 has a geometric configuration which includes a plurality of leg portions 12, 14, 16, 18, 20, 22, and 24. A pair of parallel extending side rails 26 and 28 are integrally joined with the ends of the legs.

The core has a uniform thickness Z. The legs 12, 22, and 24 are uniform in width which is indicated as X. The remaining legs 14, 16, 18, and 20 are one-half as wide as the first-named legs as indicated by $X/2$. The width of leg 14 is one-half of the combined width of legs 18 and 20. The portion of the side rail that connects leg 12 and legs 14 and 16 has a width equal to the width X of leg 12. The remaining portion of the side rails 26 and 28 have a width 2X which is twice the width of the leg 12. Since the thickness of the core is constant the different widths of the various portions of the core is correlate to the cross-sectional area thereof. The different cross-sectional areas vary the flux density in the several portions of the core.

The legs 14 and 16 are laterally spaced by a small slit 30. The legs 18 and 20 are laterally spaced by a small slit 32. The slits permit each leg to be wound separately so that the flux patterns established therein can be independently effected. The lateral distance Y between the leg 16 and leg 18 is substantially equal to the lateral distance between the leg 22 and 24. The lateral distance 2Y between the leg 20 and 22 is substantially equal to twice the lateral distance Y between the legs 16 and 18. The lateral distance 4Y between the legs 12 and 14 is four greater than the distance Y between the legs 16 and 18. The several legs and side rails provide the core with a plurality of flux paths with different flux densities in portions of the paths.

Figure 2:
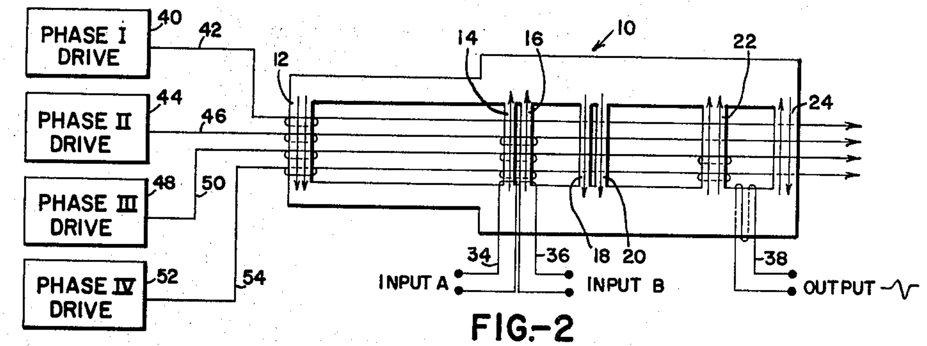
FIG. 2 is a diagrammatic showing of the magnetic circuit including the core of FIG. 1 and the windings necessary to perform the logical AUB function.

Referring to FIG. 2, the magnetic circuit includes the multi-aperture magnetic core 10. An input A winding 34 surrounds the leg 14 and an input B winding 36 surrounds the leg 16. A pulse in the input windings establishes a flux pattern in the respective legs. An output winding 38 having two turns surrounds the side rail portion between legs 22 and 24. A switching of the flux pattern around legs 22 and 24 will induce a voltage in the output winding 38.

The information set into the magnetic core by the pulses in the input windings is shifted in the magnetic core 10 in a four phase cycle. A phase I drive 40 is connected to the core by a phase I drive line 42. The line 42 surrounds legs 12, 18 and 20 of the core. A phase II drive 44 is connected to the core by a phase II drive line 46. The line 46 surrounds the legs 12, 14 and 16. A phase III drive 48 is connected to the core by a phase III drive line 50. The line 50 surrounds legs 12, 14, 16 and 22. A phase IV drive 52 is connected to the core by a phase IV drive line 54. The line 54 surrounds the legs 12, 14, 16 and 22.

The circuit is provided with directivity by selectively biasing certain leg portions to prevent them from switching. Directivity is achieved by the direction the drive lines 42, 46, 50 and 54 are wound. A current pulse in the drive lines provides a bias on the particular legs.

For purposes of explanation to show the direction of the flux pattern in the particular legs or the remanent states of the particular legs, two arrows are used. If a particular leg is half saturated or set, the leg's respective arrows are shown pointing in opposite directions.

Figure 3:
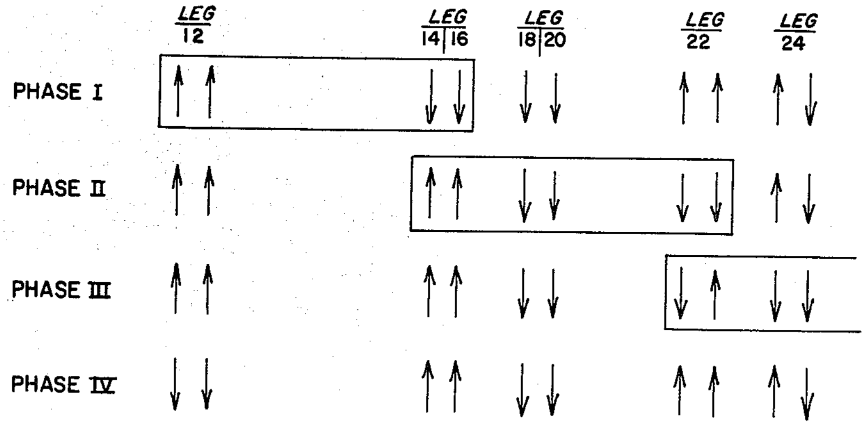
FIG. 3 is a diagram of the magnetic flux patterns in the particular leg portions of the core of FIG. 2 during each of the four time phases.

The diagram of FIG. 3 illustrates the flux patterns in the respective legs of the core 10. The operation of the magnetic circuit of FIG. 2 will be described in conjunction with this diagram.

As shown in FIG. 2 the initial flux pattern in legs 12, 18 and 20 is in a downward direction and the initial flux pattern in legs 14, 16 and 22 is in an upward direction. Leg 24 is half saturated.

Phase I: An input A pulse and an input B pulse switches the flux pattern downward in legs 14 and 16 and upward in leg 12. The flux pattern in these legs represents a bit of information. A bias applied to leg 12 aids the switching of the flux pattern therein. A bias applied to legs 18 and 20 prevents switching of the flux pattern therein.

Phase II: The phase II drive switches the flux pattern upward in legs 14 and 16. Since legs 18 and 20 are saturated downward, the flux pattern therein does not change. The bias applied to leg 12 prevents switching of the flux pattern therein. Under these conditions the flux pattern in leg 22 is switched downward.

Phase III: The phase III drive switches a portion of the flux pattern in leg 22 in an upward direction and alters the flux pattern in leg 24 so that the flux pattern therein is downward. A bias applied to legs 12, 14, and 16 prevents switching of the flux pattern therein. The change of the flux pattern in legs 22 and 24 induces a voltage in the output winding 38.

Phase IV: The phase IV drive switches the flux pattern in legs 12, 22, and 24 back to their initial directions. The magnetic flux in the core is in a condition to perform a second logical operation.

A change in the flux pattern of either leg 14 or 16 will produce an output signal. Thus, the "OR" function is achieved as there is an output signal resulting from one or more input signals when one of the input signals changes the flux pattern in one of the legs 14 or 16.

Figure 4:
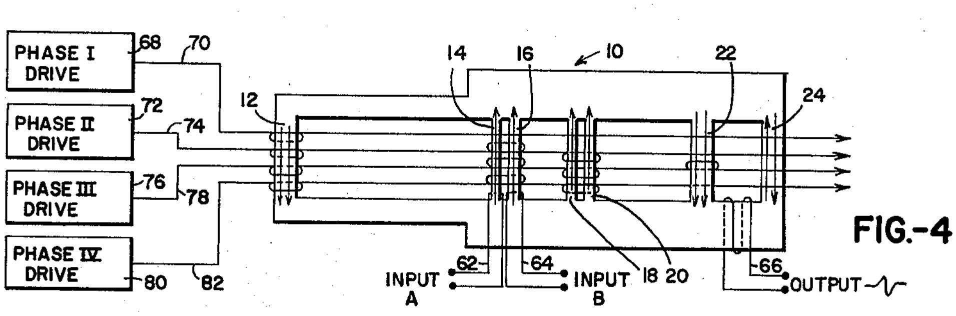
FIG. 4 is a diagrammatic showing of the magnetic circuit including the core of FIG. 1 and the windings necessary to perform the logical $\overline{A}U\overline{B}$ function.

The magnetic circuit shown in FIG. 4 performs a logical $\overline{A}\cup\overline{B}$ function. The magnetic core 10 is provided with an input A winding 62 surrounding the leg 14. An input B winding 64 surrounds the leg 16. An output winding 66 having two turns surrounds portions of the side rails between legs 22 and 24. A change in the flux pattern around legs 22 and 24 will induce a voltage in the output winding 66.

A phase I drive 68 is connected to the core by a phase I drive line 70. The line 70 surrounds leg 12 of the core 10. A phase II drive 72 is connected to the core by a phase II drive line 74. The line 74 surrounds the legs 12, 14, 16, 18 and 20. A phase III drive 76 is connected to the core by a phase III drive line 78. The line 78 surrounds the legs 12, 14, 16, 18, 20 and 22. A phase IV drive 80 is connected to the core by a phase IV drive line 82. The line 82 surrounds the legs 12, 14, 16, 18, 20 and 22.

The circuit is provided with directivity by biasing the legs to inhibit to reverse flow of the informaton. The biasing of legs is accomplished by proper winding of lines 70, 74, 78 and 82 about the legs. A current pulse in the drive lines provides a bias on the particular legs.

Figure 5:
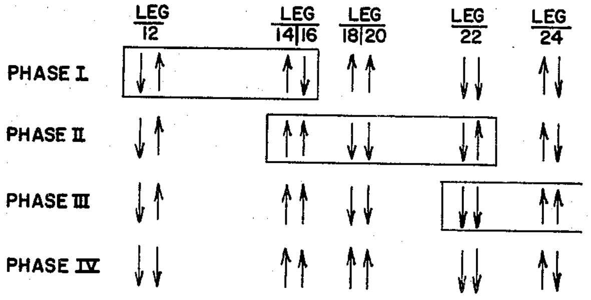
FIG. 5 is a diagram of the magnetic flux patterns in the particular leg portions of the core of FIG. 4 during each of the four time phases.

The diagram of FIG. 5 illustrates the flux pattern in the respective legs of the core 10 when an output signal is attained. The operation of the magnetic circuit of FIG. 4 will be described in conjunction with this diagram.

The initial direction of the flux pattern in legs 12 and 22 is downward and the direction of the flux patterns in legs 14, 16, 18, and 20 is upward. Leg 24 is in a half saturated or set condition.

Phase I: An input B pulse switches the flux pattern in leg 16 downward and switches half the flux in leg 12 upward. The biases applied to legs 18, 20, 22, and 24 prevent the switching of the flux patterns therein. The flux pattern in leg 14 is not switched. If an input A pulse were applied the flux pattern in leg 14 would switch in lieu of the flux pattern in leg 16. If both inputs A and B pulses were present the entire flux pattern in leg 12 would switch upward and the flux pattern in legs 14 and 16 would switch downward.

Phase II: The phase II drive 72 switches the flux pattern in leg 16 upward and in legs 18 and 20 downward. Since the flux pattern in leg 14 was upward the change in flux pattern of legs 18 and 20 switches one-half of the flux pattern in leg 22 in an upward direction. If the A and B inputs were present then the entire flux pattern in legs 18 and 20 could be switched to legs 14 and 16, and the flux pattern in leg 22 would not be switched.

Phase III: The phase III drive 76 switches the flux pattern in legs 22 downward. This results in the switching of the flux pattern in leg 24 upward. A bias applied to legs 18 and 20 prevents the switching of the flux patterns therein. The change in the direction of the flux pattern around legs 22 and 24 induces a voltage in the output winding 66. The output signal is attained from the switching of the flux pattern in leg 22. This is accomplished with an absence of one or more inputs. When both "A" and "B" inputs are present an output signal is not attained.

Phase IV: The phase IV drive 80 switches the flux patterns in legs 18 and 20 upward and the flux pattern in leg 12 downward. The flux pattern in leg 24 is one-half saturated downward. The phase IV drive switches the flux pattern back to their initial direction. The circuit is in a condition to perform a second logic operation.

Figure 6:
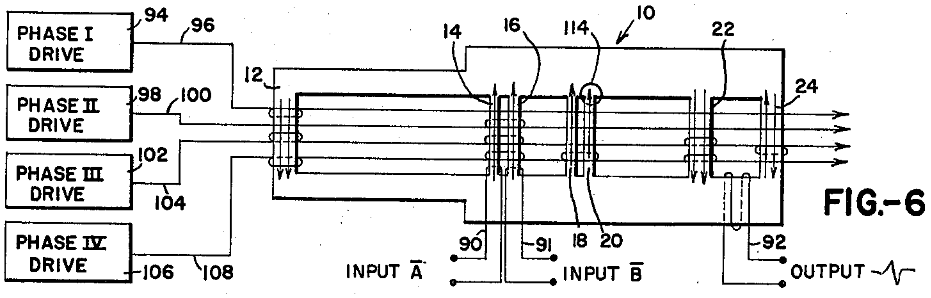
FIG. 6 is a diagrammatic showing of the magnetic circuit including the core shown in FIG. 1 and the windings necessary to perform the logical $\overline{A}\cdot\overline{B}$ function.

The magnetic circuit shown in FIG. 6 forms the logical $\overline{A}\cdot\overline{B}$ function. The circuit contains the core 10 having an input $\overline{A}$ winding 90 surrounding the leg 14 and an input $\overline{B}$ winding 91 surrounding the leg 16. An output winding 92 having two turns surrounds the portion of the core between the legs 22 and 24.

A phase I drive 94 is coupled to the core by phase I drive line 96. The line 96 surrounds the leg 12. A phase II drive 98 is coupled to the core by a phase II drive line 100. The line 100 surrounds legs 14, 16 and 18. A phase III drive 102 is coupled to the core by a phase III drive line 104. The line 104 surrounds the legs 12, 14, 16, 18, 22 and 24. A phase IV drive 106 is coupled to the core by a phase IV drive line 108. The line 108 surrounds the legs 12, 14, 16, 18, 20 and 22.

The direction of the information flow in the circuit is controlled by selectively biasing the legs of the core so that the flux patterns therein will not switch. The biasing of the legs is accomplished by winding of lines 96, 100, 104 and 108 thereon. Leg 20 has a shorted turn 114 to keep it from acting as a switching path for leg 22 during phase III. Leg 20 cannot be held upward at this time as leg 18 is, since there may have been only one input and it would have been in the downward direction preceding the phase III drive.

Figure 7:
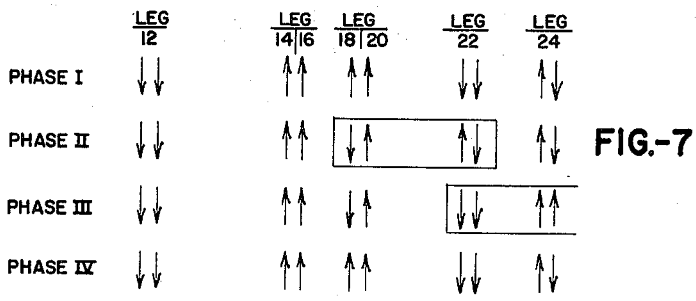
FIG. 7 is a diagram of the magnetic flux patterns in the particular leg portions in the core of FIG. 6 during each of the four time phases.

The diagram of FIG. 7 illustrates the flux patterns in the respective legs of the core 10 during the four-phase cycle when an output signal is attained. The operation of the magnetic circuit of FIG. 6 will be described in conjunction with this diagram. The initial direction of the flux pattern in legs 12 and 22 is downward and the initial direction of the flux pattern in legs 14, 16, 18 and 20 is upward. Leg 24 is half saturated.

Phase I: An absence of input "A" and input "B" results in the flux patterns of legs 12, 14 and 16 remaining unchanged. The flux pattern iin legs 14 and 16 remains upward and the flux pattern in leg 12 remains downward.

Phase II: The phase II drive switches the flux pattern in leg 18 downward. Since legs 14 and 16 are saturated upward, the flux path will be around legs 18 and 22. Part of the flux pattern in leg 22 will be upward.

Phase III: The phase III drive 102 switches the flux pattern of leg 22 downward. Leg 18 is held downward by a biasing mmf. The flux path will be around legs 22 and 24. The resulting change of the flux pattern around legs 22 and 24 induces a voltage in the output winding 92. An output signal is attained when an input "A" and and input "B" are absent.

Phase IV: The phase IV drive switches the flux pattern in legs 18 and 24 back to their initial directions. The flux patterns in the respective legs of the core are back in their initial positions: The core is in a condition to perform a second logical function.

While there have been shown and described and pointed out fundamental novel features of the invention as applied to preferred embodiments, it will be understood that various omissions, substitutions, changes in form, and details of the circuits illustrated and their operation may be made by those skilled in the art, without departing from the spirit of the invention. It is the intention, therefore, to be limited only as indicated by the scope of the following claims.

What is claimed is:

1. A magnetic circuit comprising a magnetic core having side rails and a plurality of legs including a first, second and last leg defining a plurality of flux paths, the cross-sectional area of the first leg being substantially two times the cross-sectional area of the second leg and substantially equal to the cross-sectional area of each side rail between the first and second leg, the cross-sectional area of the side rails between the second legs and remaining legs being substantially about two times the cross-sectional area of the first leg, input means coupled to the second leg to provide the circuit with two bits of information by switching the flux pattern therein, four separate drive means linked with the legs to selectively switch the flux patterns therein to shift interrogate by shifting the two bits of information in the circuit toward the last leg, bias means linked to the legs to selectively prevent switching of the flux patterns therein thereby preventing reverse flow of the information, and means coupled to the last leg to sense a flux change therein.

2. A magnetic circuit comprising a core magnetic material having two stable magnetic states, said core having a plurality of parallel legs including a first, second, third, fourth and fifth leg, input means coupled to the second leg to provide the circuit with information by switching the flux pattern therein, a first drive means coupled to the first leg for aiding the switching of the flux pattern in said first leg, a second drive means coupled to the second leg for switching the flux pattern in said second leg, a third drive means coupled to the first, second, and fourth leg for switching the flux pattern in the fourth leg around the fifth leg, a fourth drive means for switching the flux patterns of the respective legs back to their initial positions, bias means coupled with the first and third leg for selectively preventing the switching of the flux patterns therein thereby preventing reverse flow of the information, and means coupled to the fifth leg to sense the switching of the flux pattern in the fourth leg around the fifth leg.

3. A magnetic circuit as defined in claim 2 wherein the second leg is divided into first and second separate parallel portions and the input means comprises a first input means coupled to the first leg portion and a second input means coupled to the second leg portion.

4. A magnetic circuit comprising a core of magnetic material having two stable magnetic states, said core having a plurality of parallel legs including a first, second, third, fourth and fifth leg, input means coupled to the second leg to provide the circuit with two bits of information by switching the flux pattern therein, a first, second, third and fourth drive means coupled to the legs to selectively shift the flux patterns toward the fifth leg in phases, means selectively biasing the legs of the core for preventing the switching of the flux patterns therein thereby preventing reverse flow of the two bits of information, and output means coupled to the fifth leg to sense the switching of the flux pattern therein.

5. A magnetic circuit capable of performing the logical $\overline{A}U\overline{B}$ function comprising a core of magnetic material having two stable magnetic states, said core having a plurality of parallel legs including a first, second, third, fourth and fifth leg, said second leg being divided into first and second portions, input means coupled to the second leg to provide the circuit with two bits of information by switching the flux pattern therein, a first, second, third and fourth drive means coupled to the legs to selectively shift the flux patterns representing the two bits of information toward the fifth leg in phases, means selectively biasing the legs of the core for preventing the switching of the flux patterns therein thereby preventing reverse flow of the information, and output means coupled to the fifth leg to sense the switching of the flux pattern therein, wherein at phase I, an input B pulse switches the flux pattern in the first leg and the first portion of the second leg and biases applied to the third, fourth, and fifth leg prevent switching of their flux patterns, at phase II, a pulse applied to the second drive means switches the flux pattern in first portion of the second leg, the third leg, and the fourth leg, at phase III, a pulse applied to the third drive means switches the flux pattern in the fourth and fifth legs only if the two bits of information provided in the second leg establish the logical $\overline{A}U\overline{B}$ function and a bias applied to the third leg prevents the switching of its flux pattern, said switching of the flux in the fourth and fifth legs induces a voltage in the output means, and at phase IV, a pulse applied to the fourth drive means switches the flux patterns in the respective legs of the core back to their initial positions.

6. A magnetic circuit capable of performing the logical $\overline{A}\cdot\overline{B}$ function comprising a core of magnetic material having two stable magnetic states, said core having a plurality of parallel legs including a first, second, third, fourth and fifth leg, said third leg being divided into first and second portions, input means coupled to the second leg to provide the circuit with two bits of information by setting flux patterns therein, a first, second, third and fourth drive means coupled to the legs to selectively shift the flux patterns representing the two bits of information toward the fifth leg in phases, means selectively biasing the legs of the core for preventing the switching of the flux patterns therein thereby preventing reverse flow of the information, and output means coupled to the fifth leg to sense the switching of the flux pattern therein, wherein at phase I, an absence of inputs "A" and "B" pulse does not switch the flux patterns in the core, at phase II, a pulse applied to the second drive means switches the flux pattern in the first portion of the third leg and the flux pattern in the fourth leg, at phase III, a pulse applied to the third drive means switches the flux pattern in the fourth and fifth legs only if the two pieces of information provided in the second leg establish the logical $\overline{A}\cdot\overline{B}$ function and a short circuit applied to the third leg prevents the switching of its flux pattern, said switching of the flux in the fourth and fifth legs induces a voltage in the output means, and at phase IV, a pulse applied to the fourth drive means switches the flux patterns in the respective legs of the core back to their initial positions.

7. A magnetic circuit capable of performing the logical AUB function comprising a core of magnetic material having two stable magnetic states, said core having a plurality of parallel legs including a first, second, third, fourth and fifth leg, input means coupled to the second leg to provide the circuit with two bits of information by setting flux pattern therein, a first, second, third and fourth drive means coupled to the legs to selectively shift the flux patterns representing the two bits of information toward the fifth leg in phases, means selectively biasing the legs of the core for preventing the switching of the flux patterns therein thereby preventing reverse flow of the information, and output means coupled to the fifth leg to sense the switching of the flux pattern therein, wherein at phase I, an input A and input B pulse applied to the input means switches the flux pattern in the first and second legs and a bias applied to the third leg prevents the switching of its flux pattern, at phase II, a pulse applied to the second drive means switches the flux pattern in the second and fourth legs and a bias applied to the first leg prevents the switching of its flux pattern, at phase III, a pulse applied to the third drive means switches the flux pattern in the fourth and fifth legs only if the two pieces of information provided in the second leg establish the logical AUB function and a bias applied to the first and second leg prevents switching of their flux patterns, said switching of the flux in the fourth and fifth legs induces a voltage in the output means, and at phase IV, a pulse applied to the fourth drive means switches the flux pattern in the respective legs of the core back to their initial positions.

8. A magnetic circuit comprising:

a core of magnetic materials having two magnetic states, said core including a pair of parallel side rails, a plurality of parallel legs including a first and second legs secured to each side rail, the cross sectional area of each side rail between the first and second leg being substantially equal to the cross sectional area of the first leg, said area of each side rail between the second and the remaining legs being substantially about two times the cross-sectional area of the first leg, and the lateral distance between the first leg and second leg being substantially about four times the lateral distance between the second leg and the third leg, input means coupled to the second leg to provide the circuit with information by switching the flux pattern therein, a first drive means coupled to the first leg for aiding the switching of the flux pattern in said first leg, a second drive means coupled to the second leg for switching the flux pattern in said second leg, a third drive means coupled to the first, second, and at least one remaining leg for switching the flux pattern in the remaining leg around at least one other remaining leg, a fourth drive means for switching the flux patterns of all respective legs back to their initial positions, bias means coupled with the first leg and at least one remaining leg for selectively preventing the switching of the flux patterns therein thereby preventing reverse flow of the information, and means coupled with at least one of the remaining legs to sense the switching for the flux pattern caused by the fourth drive means.

9. In a magnetic circuit, a multi-aperture core of magnetic material having two stable magnetic states, said core including a pair of parallel side rails, seven separate parallel legs secured to each side rail, the cross-sectional area of the second, third, fourth, and fifth legs respectively being substantially about one-half the cross-sectional area of the first leg, the cross-sectional area of the first, sixth and seventh leg being substantially equal, the cross-sectional area of each side rail between the first and second leg being substantially equal to the cross-sectional area of the first leg, said area of each side rail between the second leg and seventh leg being substantially about two times the cross-sectional area of the first leg, the lateral distance between the first and second leg being substantially about four times the lateral distance between the second and fourth leg, the second and third legs and the fourth and fifth legs respectively being separated by a relatively narrow slit, and the lateral distance between the fifth and sixth leg being greater than the lateral distance between the third and fourth leg, input means coupled to the second and third legs to provide the circuit with information by switching the flux pattern therein, a first drive means coupled to the first leg for aiding the switching of the flux pattern in said first leg, a second drive means coupled to the second leg for switching the flux pattern in said second leg, a third drive means coupled to the first, second, third and sixth leg for switching the flux pattern in the sixth leg around the seventh leg, a fourth drive means for switching the flux patterns of the respective legs back to their initial positions, bias means coupled with the first and fourth and fifth legs for selectively preventing the switching of the flux patterns therein thereby preventing reverse flow of the information, and means coupled to the seventh leg to sense switching of the flux pattern in the sixth leg around the seventh leg.

References Cited by the Examiner

UNITED STATES PATENTS

| | | | |
|---|---|---|---|
| 2,779,926 | 1/57 | Johnson et al. | 336—215 XR |
| 2,922,972 | 1/60 | Gordy | 336—215 |
| 2,927,307 | 3/60 | Rajchman | 340—174 |
| 3,077,583 | 2/63 | Russell | 340—174 |

IRVING L. SRAGOW, *Primary Examiner.*